(12) United States Patent
Jones

(10) Patent No.: US 8,894,368 B2
(45) Date of Patent: Nov. 25, 2014

(54) DEVICE AND METHOD FOR ALIGNING TIP SHROUDS

(75) Inventor: Mark Andrew Jones, Greer, SC (US)

(73) Assignee: General Electric Company, Schenectady, NY (US)

( * ) Notice: Subject to any disclaimer, the term of this patent is extended or adjusted under 35 U.S.C. 154(b) by 508 days.

(21) Appl. No.: 13/343,271

(22) Filed: Jan. 4, 2012

(65) Prior Publication Data

US 2013/0170994 A1    Jul. 4, 2013

(51) Int. Cl.
*F01D 5/26* (2006.01)

(52) U.S. Cl.
USPC .......................................... 416/191

(58) Field of Classification Search
USPC ................. 416/189, 190, 191, 195, 196 R
See application file for complete search history.

(56) References Cited

U.S. PATENT DOCUMENTS

| | | | |
|---|---|---|---|
| 3,377,050 A * | 4/1968 | Guy .............................. | 416/191 |
| 3,576,377 A * | 4/1971 | Beanland et al. ............. | 416/191 |
| 3,649,133 A | 3/1972 | Wagner | |
| 4,257,742 A * | 3/1981 | Ogata et al. ................... | 416/190 |
| 4,257,743 A * | 3/1981 | Fujii ......................... | 416/196 R |
| 4,576,551 A * | 3/1986 | Olivier et al. ................. | 416/191 |
| 4,722,668 A * | 2/1988 | Novacek ....................... | 416/190 |
| 4,767,273 A | 8/1988 | Partington | |
| 4,840,539 A * | 6/1989 | Bourcier et al. .............. | 416/191 |
| 5,154,581 A * | 10/1992 | Borufka et al. .............. | 416/190 |
| 5,156,529 A | 10/1992 | Ferleger et al. | |
| 5,730,584 A | 3/1998 | Dodd | |
| 6,241,471 B1 | 6/2001 | Herron | |
| 7,001,152 B2 * | 2/2006 | Paquet et al. ................. | 416/190 |
| 7,946,816 B2 | 5/2011 | Brittingham | |
| 2008/0145227 A1 | 6/2008 | Maier et al. | |
| 2013/0101395 A1 * | 4/2013 | Miller et al. .................. | 415/119 |

FOREIGN PATENT DOCUMENTS

JP    54-135906 A   * 10/1979

OTHER PUBLICATIONS

Fujii, Moving Blade Cover, Oct. 22, 1979, Abstract of JPS 54-135906A.*

* cited by examiner

*Primary Examiner* — Liam McDowell
(74) *Attorney, Agent, or Firm* — Dority & Manning, PA.

(57) ABSTRACT

A device for aligning tip shrouds includes a platform configured to connect to a blade, a first projection that extends circumferentially across at least a portion of the platform, and a first complementary alignment feature on the first projection. A method for aligning tip shrouds includes rotating a plurality of tip shrouds, wherein each tip shroud is coupled to a blade, and aligning adjacent tip shrouds by nesting a first alignment feature of a first tip shroud into a second alignment feature of a second tip shroud.

20 Claims, 9 Drawing Sheets

(12) United States Patent

DEVICE AND METHOD FOR ALIGNING TIP SHROUDS

FIELD OF THE INVENTION

The present invention generally relates to a device and method for aligning tip shrouds in a rotary machine.

BACKGROUND OF THE INVENTION

Rotary machines, including turbines are widely used in a variety of aviation, industrial, and power generation applications to perform work. Each rotating machine generally includes alternating stages of peripherally mounted stator vanes and rotating blades. The stator vanes may be attached to a stationary component such as a casing that surrounds the rotating machine, and the rotating blades may be attached to a rotor located along an axial centerline of the rotating machine. A compressed working fluid, such as but not limited to steam, combustion gases, or air, flows along a gas path through the rotating machine to produce work. The stator vanes accelerate and direct the compressed working fluid onto the subsequent stage of rotating blades to impart motion to the rotating blades, thus turning the rotor and performing work.

Compressed working fluid that leaks around or bypasses the stator vanes or rotating blades reduces the efficiency of the rotating machine. As a result, the casing surrounding the turbine often includes a stationary shroud or stationary shroud segments that surround and define the outer perimeter of the gas path to reduce the amount of compressed working fluid that bypasses the stator vanes or rotating blades. In addition, each rotating blade may include a tip shroud disposed at an outer radial tip of the rotating blades. As the turbine rotates and cycles through various stages of operation, the tip shrouds may form a seal at the radial tip of the turbine blades and further reduce leakage of the compressed working fluid between the radial tip of the blade and the casing.

Tip shroud aerodynamic properties and mechanical performance are important design considerations that balance efficiency and performance on the one hand with blade life on the other hand. For example, although a tip shroud may reduce leakage of the working fluid, tip shrouds also generally increase the mass at the tip of the blade, which may increase creep or yield of the tip shroud. Creep or yield, in turn may reduce the life of the turbine blade, increase maintenance cost and/or extend outages. In addition, a tip shroud that fails may introduce debris into the gas path that may cause significant damage to the casing, downstream stators, and/or blades. As a result, continued improvements in devices and methods for aligning tip shrouds in a rotary machine would be useful.

BRIEF DESCRIPTION OF THE INVENTION

Aspects and advantages of the invention are set forth below in the following description, or may be obvious from the description, or may be learned through practice of the invention.

One embodiment of the present invention is a device for aligning tip shrouds. The device includes a platform configured to connect to a blade, a first projection that extends circumferentially across at least a portion of the platform, and a first complementary alignment feature on the first projection.

A second embodiment of the present invention is a device for aligning tip shrouds. The device includes a first platform configured to connect to a first blade, a first projection that extends circumferentially across at least a portion of the first platform and a first alignment feature on the first projection. A second platform configured to connect to a second blade adjacent to the first rotary blade, a second projection that extends circumferentially across at least a portion of said second platform and a second alignment feature on said second projection, wherein the first alignment feature nests at least partially inside the second alignment feature.

The present invention may also include a method aligning tip shrouds. The method includes rotating a plurality of tip shrouds, wherein each tip shroud is coupled to a blade, aligning adjacent tip shrouds by nesting a first alignment feature of a first tip shroud into a second alignment feature of a second tip shroud.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
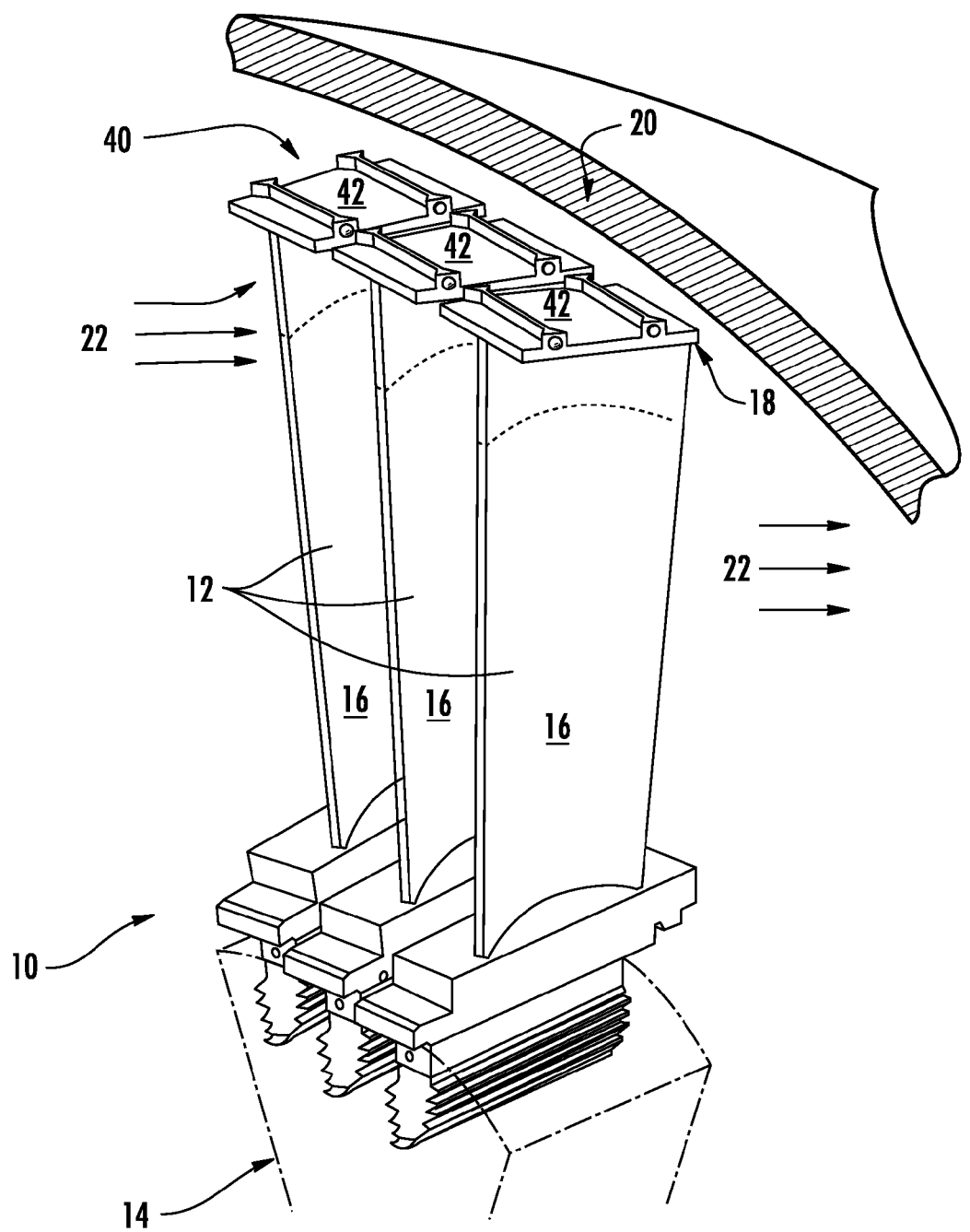
FIG. 1 is a partial perspective view of a rotary machine stage according to one embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location, quantity or importance of the individual components.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention include a device and method for aligning tip shrouds in any system having a pressurized gas flow-path and rotating components, such as a compressor, a gas turbine, a steam turbine, a jet engine or any other rotary machine. The device and method generally includes tip shrouds that have complementary alignment features. In particular embodiments, the alignment features may radially, axially, and/or circumferentially align adjacent tip shrouds. In this manner, the tip shrouds enhance the seal of the gas path and an improved seal may reduce leakage of pressurized gas around the blade radial tip, thus utilizing more of the pressurized gas to increase overall rotary machine efficiency. In addition, improved alignment of the tip shrouds reduce or prevent adjacent tip shrouds from overlapping and/or increase the life of individual tip shrouds further reducing maintenance cost and further increasing overall rotating machine efficiency.

FIG. 1 provides a partial perspective view of a rotary machine blade stage 10 according to one embodiment of the present invention. It should be known that the term "blade" may include any rotating blade utilized within a rotary machine. For example, "blade" may include but is not limited to compressor and/or turbine blades. As shown, each stage 10 generally includes a plurality of adjacent blades 12 circumferentially connected to a rotor 14. Each blade 12 generally includes an airfoil 16 that extends radially outward from the rotor 14 and terminates at a radial tip 18. A casing 20 circumferentially surrounds the blade stage 10 to define a gas path 22 between the casing 20 and the rotor 14. In this manner, a pressurized working fluid may flow axially across the blades 12 to cause the blades 12, and thus the rotor 14, to rotate.

As shown in FIG. 1, the blade stage 10 may include a device 40 for aligning tip shrouds 42 that prevents adjacent tip shrouds 42 from overlapping. The device 40 may generally include one or more tip shrouds 42 configured for connection to the radial tips 18 of the blades 12. The tip shrouds 42 may be mechanically attached to the blades 12, such as by welding. Alternately, the tip shrouds 42 may be cast as an integral part of the blades 12 or may be machined. In this manner, adjacent tip shrouds may form a barrier at the radial tips 18 of the blades 12 as the rotary machine cycles through various operating conditions.

Figure 2:
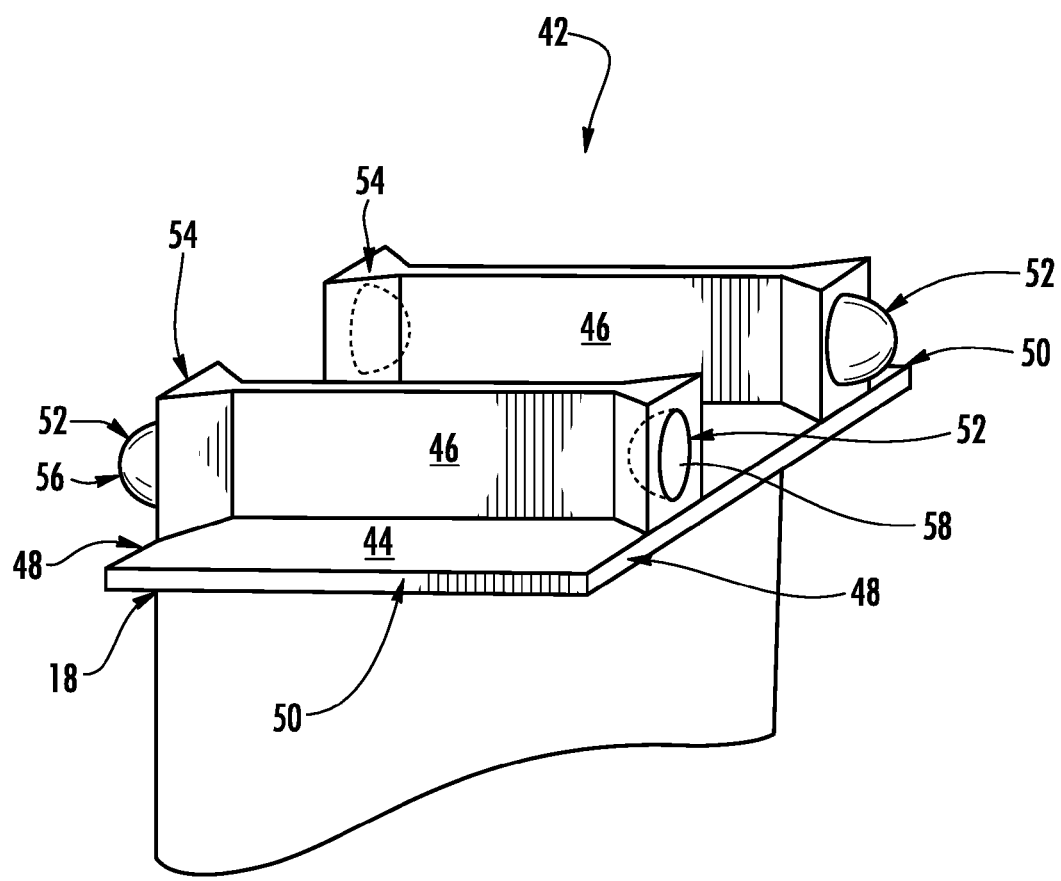
FIG. 2 is an enlarged perspective view of a tip shroud as shown in FIG. 1.
Figure 3:
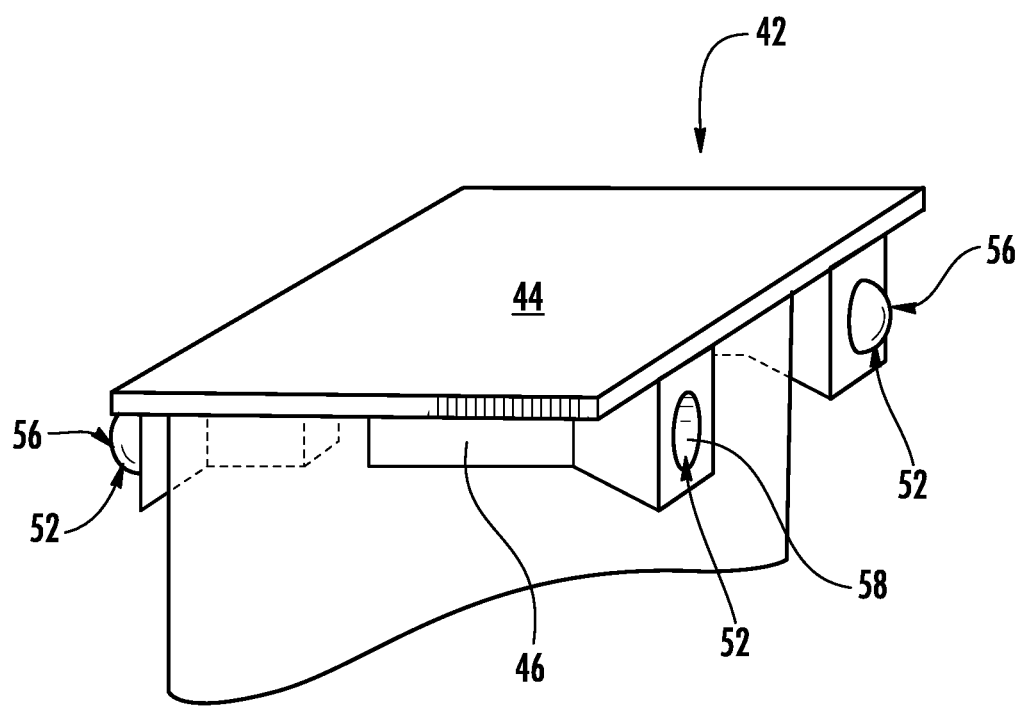
FIG. 3 is an enlarged perspective view of a tip shroud as shown in FIG. 1 according to an alternate embodiment of the present invention.
Figure 4:
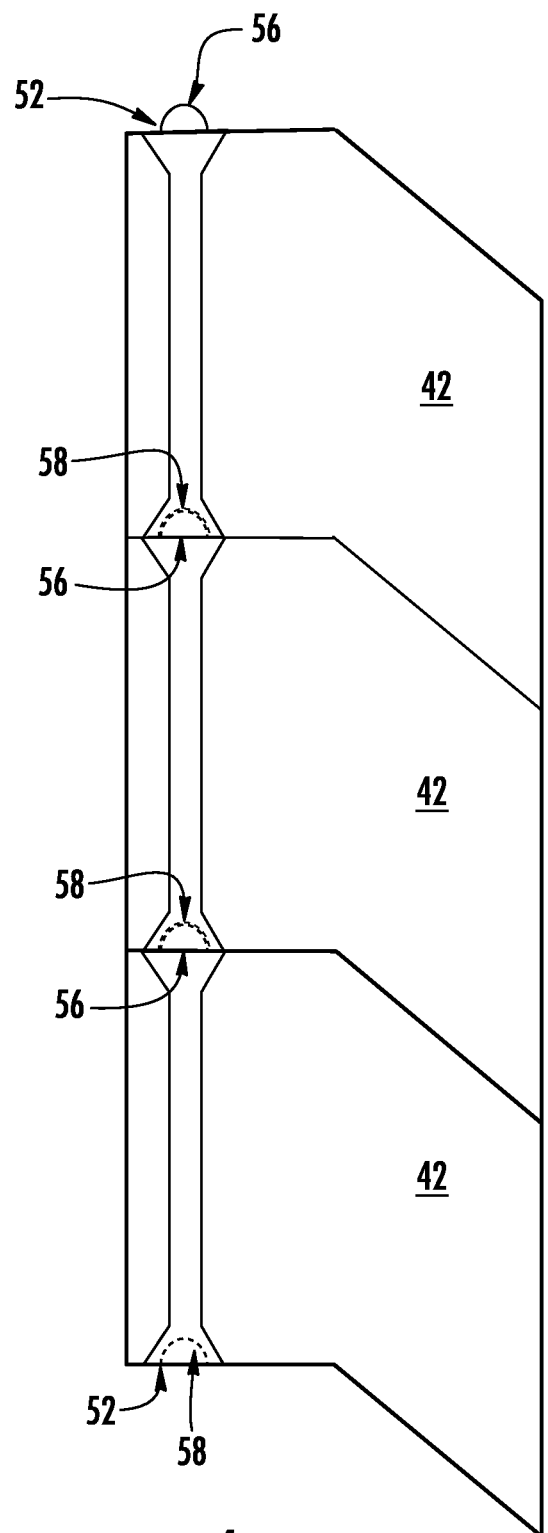
FIG. 4 is a radially inward view of adjacent tip shrouds shown in FIG. 1.

FIG. 2 provides an enlarged perspective view of the tip shroud 42 shown in FIG. 1. FIG. 3 provides and enlarged perspective view of the tip shroud as shown in FIG. 1 according to an alternate embodiment of the present invention, and FIG. 4 provides a radially inward plan view of adjacent tip shrouds 42 as shown in FIG. 1. As shown in FIG. 2, each tip shroud 42 generally includes a platform 44 and one or more projections 46. The platform 44 generally includes a pair of opposed axially extending surfaces 48 and circumferentially extending surfaces 50. The axially extending surfaces 48 may be straight, angled or curved to provide a complementary surface for platforms 44 of adjacent tip shrouds 42.

As shown in FIG. 1, each platform 44 may include one or more projections 46 extending generally circumferentially across at least a portion of the platform 44 and may have a constant or varying thickness and a constant or varying radial height. As show in FIG. 2, the one or more projections 46 may extend radially outward from the platform 44. In alternate embodiments, as shown in FIG. 3, the one or more projections 46 may extend radially inward from the platform 44. In addition, each projection 46 may include complementary alignment features 52 positioned on a first or second end 54 of the projection 46 that enhance radial and/or axial alignment between adjacent tip shrouds 42. The complementary alignment features 52 may include, for example, male and female surfaces in the projections 46. For example, as shown in FIGS. 2 and 3, the complementary alignment features may be a combination of spherical protrusions 56 and recesses 58 on opposite ends of the projections 46. As the blades 12 rotate, the tip shrouds 42 may come into contact with adjacent tip shrouds due to centrifugal forces and/or thermal expansion of the tip shrouds 42. As a result, the spherical protrusions 56 on a first tip shroud 42 nest inside the spherical recesses 58 of a second adjacent tip shroud 42 to align adjacent tip shrouds 42 in the radial and/or axial planes. As a result, mechanical and/or thermal stresses at the tip shroud platform 44 may be significantly reduced between adjacent tip shrouds 42. In addition, the complementary alignment features 52 may prevent adjacent platforms 44 from buckling or overlapping. As a result, larger tip shrouds 42 may be utilized at the radial tip 18 of blades 12 to enhance sealing of the gas path 22 without compromising blade life.

Figure 5:
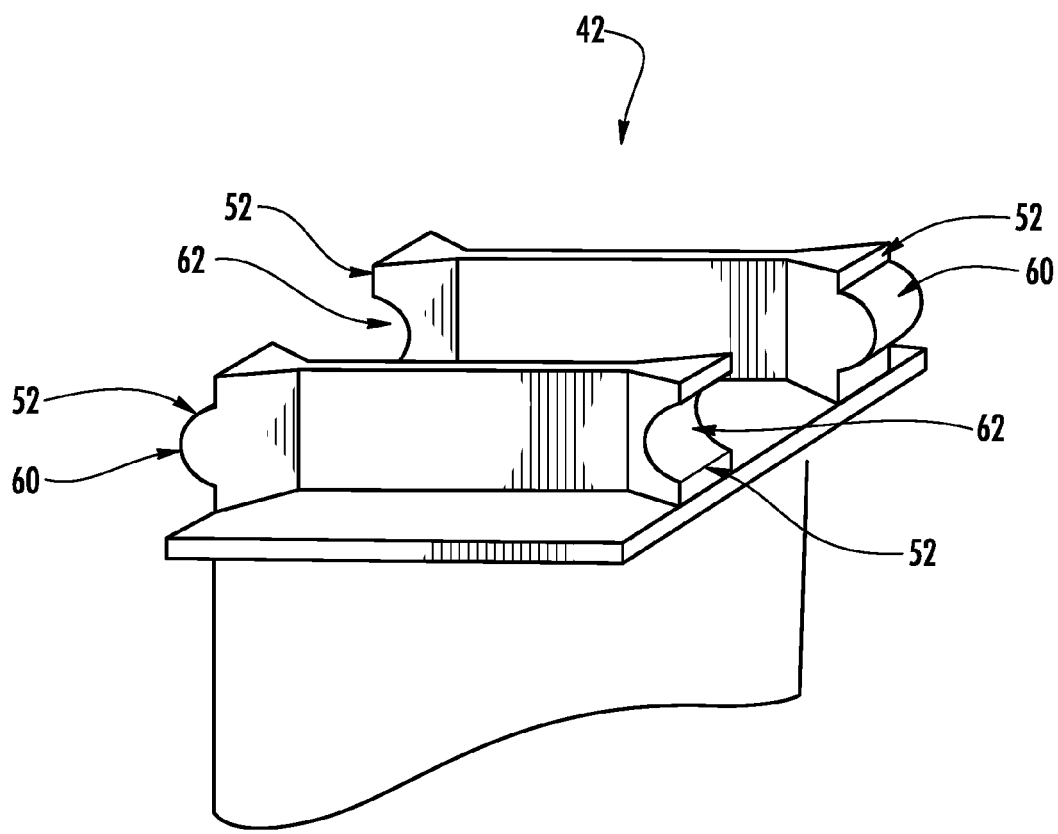
FIG. 5 is an enlarged perspective view of a tip shroud as shown in FIG. 1, according to an alternate embodiment of the present invention.
Figure 6:
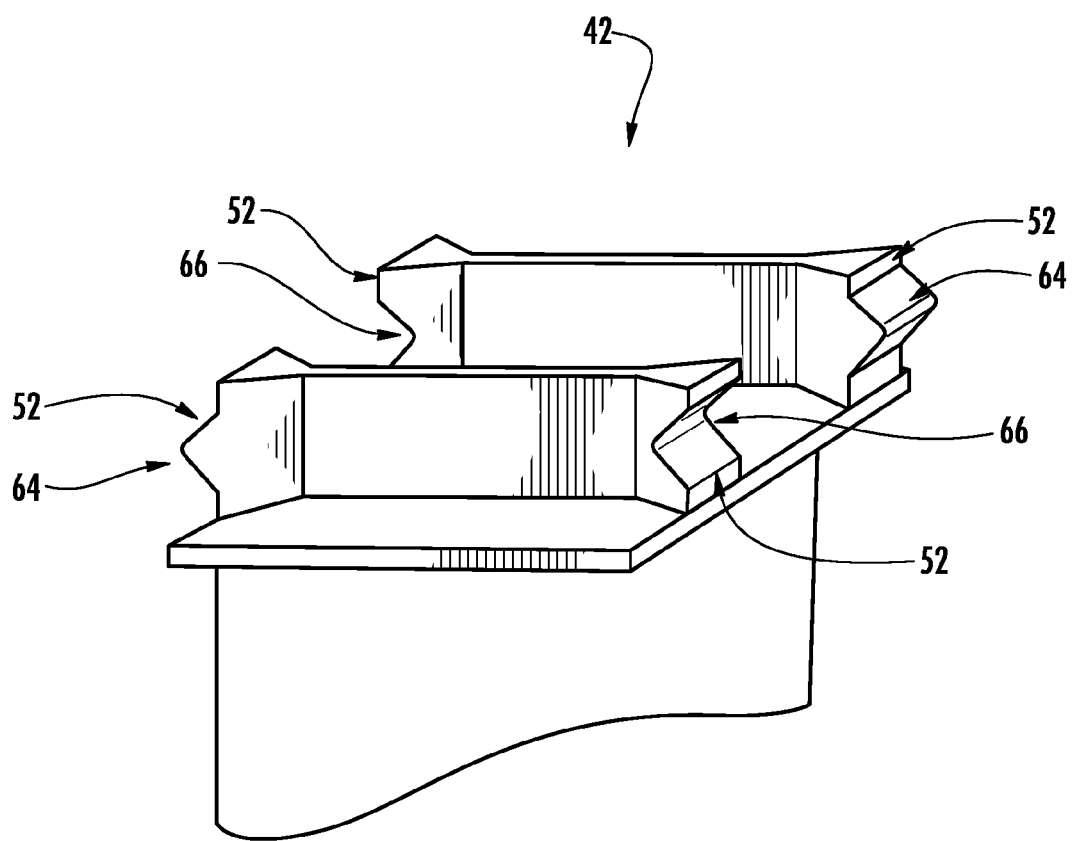
FIG. 6 is an enlarged perspective view of a tip shroud as shown in FIG. 1, according to an alternate embodiment of the present invention.

FIGS. 5-9 illustrate alternate embodiments of complementary alignment features 52 within the scope of the present invention. The complementary alignment features 52 may be cylindrical or angled protrusions 60, 64 and recesses 62, 66 as shown in FIGS. 5 and 6, respectively. These shapes may allow for radial alignment, radial load transfer between adjacent tip shrouds 42, and/or provide damping between adjacent blades as the turbine cycles through various operational conditions. In addition, these shapes may allow for large axial misalignment or movement between adjacent tip shrouds 42 as shown in FIG. 1, during cold assembly of the turbine rotor or operation of the turbine.

Figure 7:
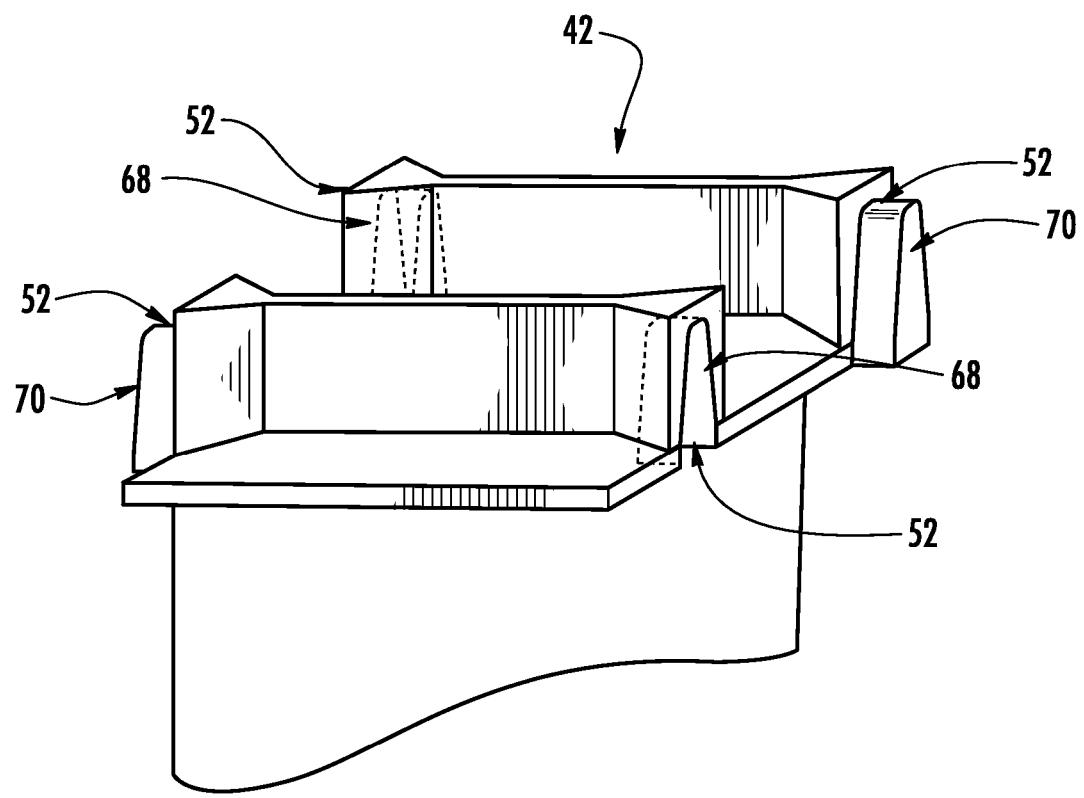
FIG. 7 is an enlarged perspective view of a tip shroud as shown in FIG. 1, according to an alternate embodiment of the present invention.
Figure 8:
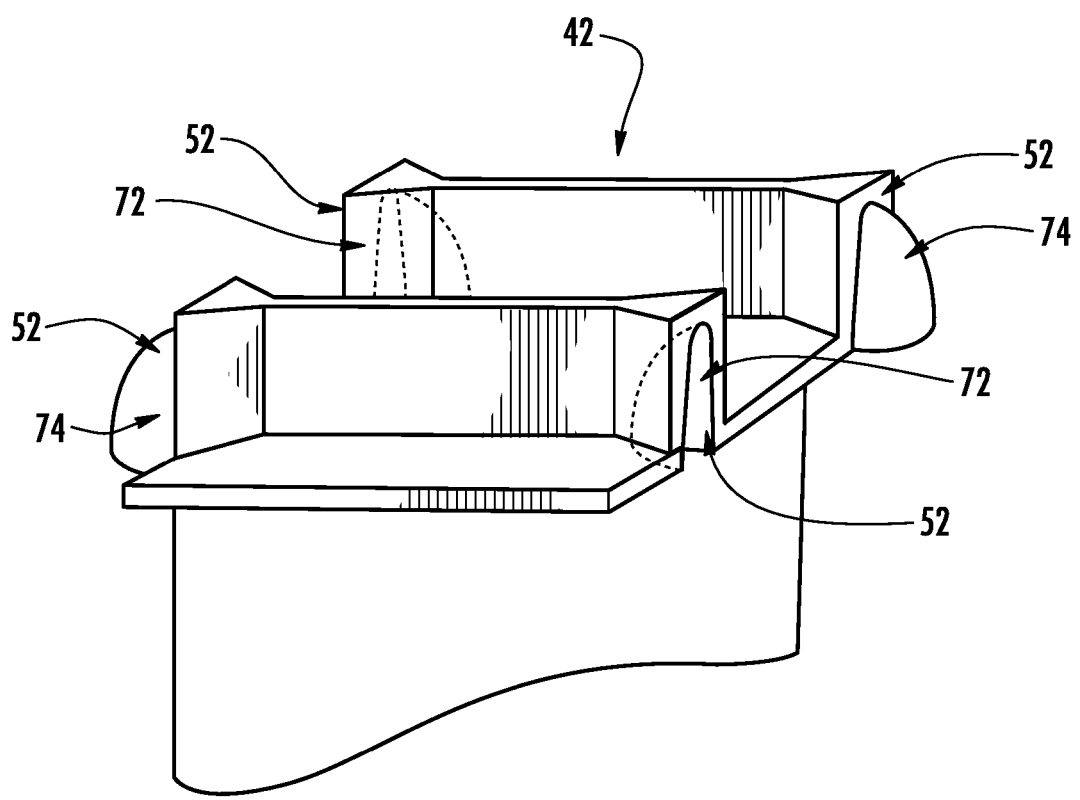
FIG. 8 is an enlarged perspective view of a tip shroud as shown in FIG. 1, according to an alternate embodiment of the present invention.

FIGS. 7 and 8 illustrate complementary alignment features 52 which may be generally polygonal, elliptical, parabolic or spherically slotted and radially open recesses 68, 72 and protrusions 70, 74 as shown in FIGS. 7 and 8 respectfully. The slotted and radially open recesses 68, 72 may include one or more mating surfaces and an opening, and the protrusions 70, 74 may include one or more complementary mating surfaces. Each of these alternate embodiments may provide a larger mating surface area between the complementary alignment features 52. As a result, radial alignment and transfer of radial loads between adjacent tip shrouds 42 during rotary machine operation may be provided, thus preventing overlapping between adjacent tip shrouds 42, allowing for larger tip shrouds 42, and improving the gas path seal at the radial tip 18 of the blades 12.

Figure 9:
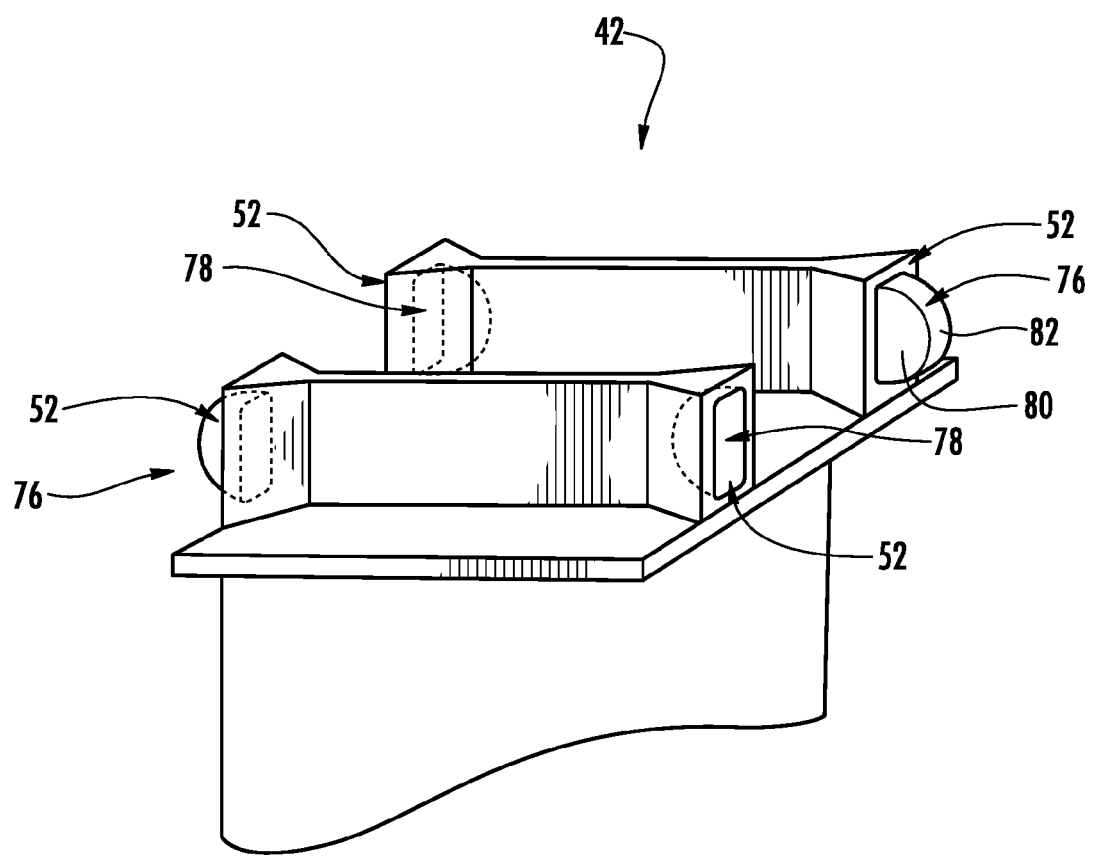
FIG. 9 is an enlarged perspective view of a tip shroud as shown in FIG. 1, according to an alternate embodiment of the present invention.

FIG. 9 illustrates complementary alignment features 52 which may be biscuit and/or cylindrically shaped protrusions 76 and recesses 78. As shown in FIG. 9, biscuit shaped complementary alignment features 52 may include flat surfaces 80 and an arcuate surface 82. In addition to allowing for radial alignment and/or transfer of radial loading between adjacent tip shrouds 42 the biscuit shaped complementary alignment features 52 may constrain axial movement between adjacent tip shrouds 42 as the turbine cycles through various operating conditions, thus improving the sealing performance of adjacent tip shrouds 42.

The various embodiments shown and described with respect to FIGS. 1-9 may also provide a method for aligning adjacent tip shrouds 42 including rotating a plurality of tip shrouds 42 which may be coupled to a rotating blade 12, aligning adjacent tip shrouds 42 by nesting a first alignment feature 52 of a first tip shroud 42 into a second alignment feature 52 of a second tip shroud 42. The method may further comprise nesting a third alignment feature 52 of the first tip 42 shroud into a fourth alignment feature 52 of the second tip 42 shroud. This method may create a gas path seal at the radial tip 18 of adjacent blades 12, thus inhibiting pressurized working fluid leakage over the radial tip 18 of the blades 12 and preventing overlapping of adjacent tip shrouds 42. As a result, larger tip shrouds 42 may be designed and blade 12 life may be improved, thus increasing overall rotary machine efficiency and decreasing rotary machine maintenance costs.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A device for aligning tip shrouds, comprising:
   a. a platform connected to a radial tip of an airfoil;
   b. a first projection that extends circumferentially across at least a portion of said platform, said first projection extending radially outwardly from a top surface of said platform, said first projection having an end portion which is perpendicular to said top surface;
   c. a first complementary alignment feature defined on said end portion of said first projection;
   d. a second projection that extends circumferentially across at least a portion of said platform parallel to said first projection, said second projection extending radially outwardly from said top surface of said platform, said second projection having an end portion which is perpendicular to said top surface; and
   e. a second complementary alignment feature defined on said end portion of said second projection;
   f. wherein one of said first and second complementary alignment features is defined by a protrusion and the other of said first and second complementary alignment features is defined by a recess.

2. The device of claim 1, wherein at least one of said first and second complementary alignment features is arcuate.

3. The device of claim 1, wherein said first complementary alignment feature and said second complementary alignment feature align said platform in one plane.

4. The device of claim 1, wherein said first complementary alignment feature and said second complementary alignment feature align said platform in two planes.

5. The device of claim 1, wherein said first complementary alignment feature is defined by a recess in an end portion of said first projection and said second complementary alignment feature is defined by a protrusion which extends outwardly from an end portion of said second projection.

6. The device of claim 5, wherein said first complementary alignment feature of said first projection extends radially through an inner surface of said platform.

7. The device of claim 1, wherein said second complementary alignment feature is defined by a recess in an end portion of said second projection and said first complementary alignment feature is defined by a protrusion which extends outwardly from an end portion of said first projection.

8. The device of claim 7, wherein said second complementary alignment feature of said second projection extends radially through a bottom surface of said platform.

9. A device for aligning tip shrouds, comprising:
   a. a first platform connected to a radial tip of a first blade;
   b. a first projection that extends circumferentially across at least a portion of said first platform, said first projection extending radially outwardly from a top surface of said first platform;
   c. a first alignment feature disposed along an end portion of said first projection;
   d. a second platform connected to a radial tip of a second blade adjacent to the first blade;
   e. a second projection that extends circumferentially across at least a portion of said second platform, said second projection extending radially outwardly from a top surface of said second platform;
   f. a second alignment feature disposed along an end portion of said second projection, wherein said end portion of said first projection and said end portion of said second projection are circumferentially adjacent; and
   g. wherein said first alignment feature is formed to nest at least partially inside said second alignment feature.

10. The device of claim 9, wherein said first and second alignment features are arcuate.

11. The device of claim 9, wherein at least one of said first projection and said second projection has a varying thickness across said first platform or said second platform.

12. The device of claim 9, wherein said first and second alignment features align said first and second platforms in one plane.

13. The device of claim 9, wherein said first and second alignment features align said first and second platforms in two planes.

14. The device of claim 9, further comprising a third projection that extends circumferentially across at least a portion of said first platform parallel to said first projection, said third projection having a third alignment feature defined along an end portion of said third projection, and a fourth projection that extends circumferentially across at least a portion of said second platform parallel to said second projection, said fourth projection having a fourth alignment feature defined along an end portion of said fourth projection.

15. The device of claim 14, wherein said third alignment feature nests at least partially inside said fourth alignment feature.

16. The device of claim 14, wherein said fourth alignment feature nests at least partially inside said third alignment feature.

17. The device of claim 14, wherein said second alignment feature of said second projection extends radially through a bottom surface of said second platform.

18. The device of claim 14, wherein said third alignment feature of said third projection extends radially through a bottom surface of said first platform or said fourth projection extends radially through a bottom surface of said second platform.

19. A tip shroud, comprising:
   a. a platform connected to a radial tip of an airfoil;
   b. a first projection that extends circumferentially across at least a portion of said platform, said first projection extending radially inwardly from a bottom surface of said platform;
   c. a first alignment feature defined along an end portion of said first projection;
   d. a second projection that extends circumferentially across at least a portion of said platform parallel to said first projection, said second projection extending radially inwardly from said bottom surface of said platform; and e. a second alignment feature defined along an end portion of said second projection.

20. The device as in claim 19, wherein at least one of said end portion of said first projection and said end portion of said second projection is substantially perpendicular to said inner surface of said platform.

* * * * *